US012596727B1

(12) United States Patent
Edery et al.

(10) Patent No.: US 12,596,727 B1
(45) Date of Patent: Apr. 7, 2026

(54) MACHINE LEARNING MODEL DYNAMIC CONTENT CLASSIFICATION AND CONTEXTUALIZATION

(71) Applicant: INTUIT INC., Mountain View, CA (US)

(72) Inventors: Kalev Edery, Ramat Gan (IL); Yael Hochma, Tel Aviv (IL); Shon Mendelson, Tel Aviv (IL); Eilon Sheetrit, Tel-Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/286,940

(22) Filed: Jul. 31, 2025

(51) Int. Cl.
 *G06F 16/28* (2019.01)
 *G06F 16/242* (2019.01)

(52) U.S. Cl.
 CPC .......... *G06F 16/285* (2019.01); *G06F 16/243* (2019.01)

(58) Field of Classification Search
 CPC ................................................... G06F 16/285
 USPC ........................................................ 707/706
 See application file for complete search history.

(56) References Cited

U.S. PATENT DOCUMENTS

2022/0301031 A1* 9/2022 Iyer .................... G06Q 30/0623
2023/0315996 A1* 10/2023 Batra ..................... G06N 20/00
                                                           704/9
2024/0160953 A1* 5/2024 Manda ..................... G06N 5/01
2024/0386015 A1* 11/2024 Crabtree ............. G06F 16/9024

OTHER PUBLICATIONS

ShieldGemma Team, Google LLC "ShieldGemma: Generative AI Content Moderation Based on Gemma", Aug. 4, 2024, arXiv:2407. 21772v2 [cs.CL].

* cited by examiner

*Primary Examiner* — Muluemebet Gurmu
(74) *Attorney, Agent, or Firm* — Patterson + Sheridan, LLP

(57) ABSTRACT

Techniques described herein involve providing a dynamic content classification and contextualization system using machine learning models. Embodiments include determining, using a machine learning model, a classification of content contained in an input provided to the machine learning model. Embodiments further include generating, using the machine learning model, a confidence score for the classification. Embodiments further include extracting one or more entities from the content based on determining that the confidence score is below a threshold score. Embodiments further include retrieving, using a language processing machine learning model, contextual data from a searchable knowledge base based on the one or more entities extracted from the content. Embodiments further include generating, using the machine learning model, an updated classification based on the retrieving. Embodiments further include performing an action based on the updated classification.

17 Claims, 5 Drawing Sheets

200

300

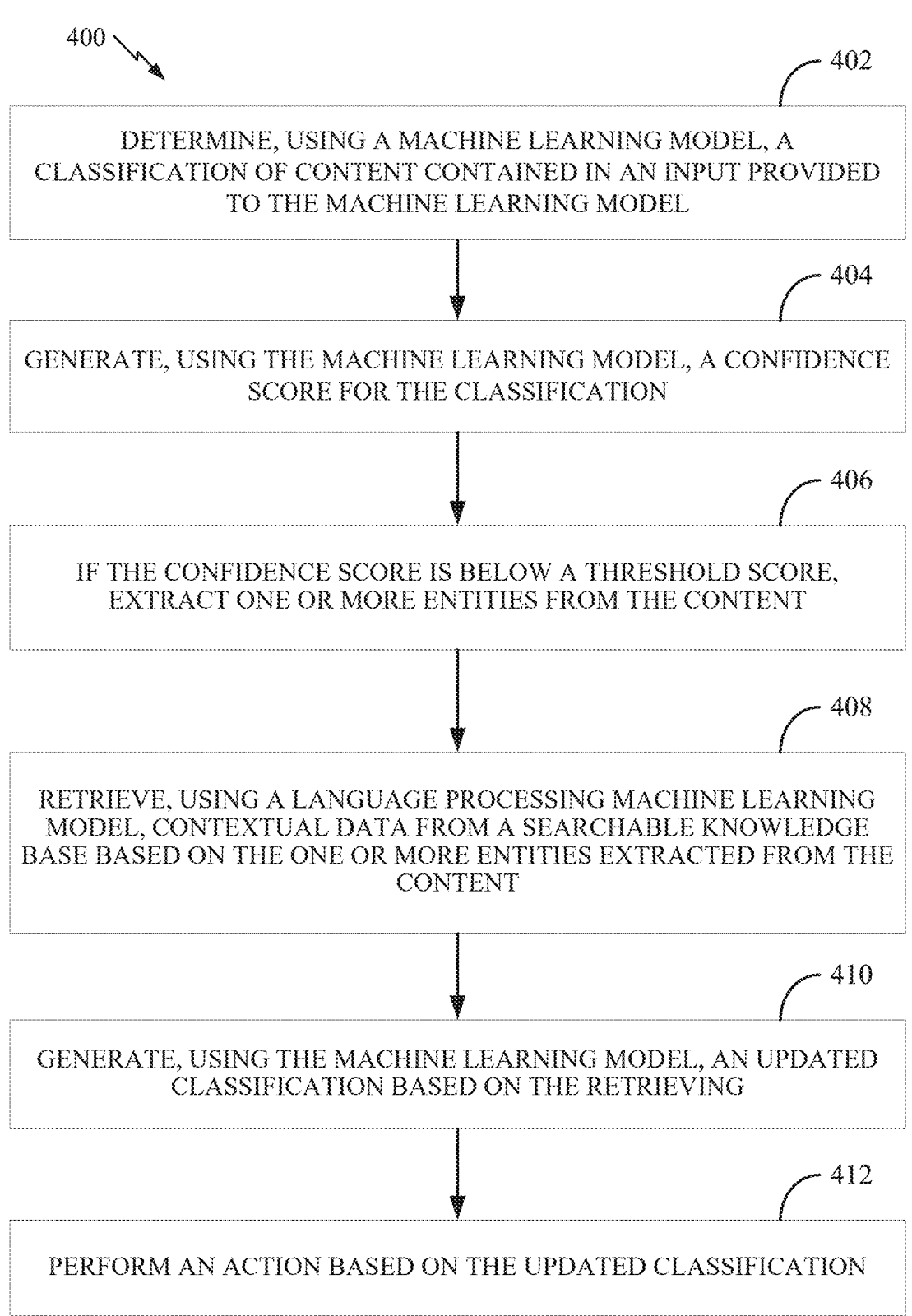

400

402

DETERMINE, USING A MACHINE LEARNING MODEL, A CLASSIFICATION OF CONTENT CONTAINED IN AN INPUT PROVIDED TO THE MACHINE LEARNING MODEL

404

GENERATE, USING THE MACHINE LEARNING MODEL, A CONFIDENCE SCORE FOR THE CLASSIFICATION

406

IF THE CONFIDENCE SCORE IS BELOW A THRESHOLD SCORE, EXTRACT ONE OR MORE ENTITIES FROM THE CONTENT

408

RETRIEVE, USING A LANGUAGE PROCESSING MACHINE LEARNING MODEL, CONTEXTUAL DATA FROM A SEARCHABLE KNOWLEDGE BASE BASED ON THE ONE OR MORE ENTITIES EXTRACTED FROM THE CONTENT

410

GENERATE, USING THE MACHINE LEARNING MODEL, AN UPDATED CLASSIFICATION BASED ON THE RETRIEVING

412

PERFORM AN ACTION BASED ON THE UPDATED CLASSIFICATION

FIG. 4

MACHINE LEARNING MODEL DYNAMIC CONTENT CLASSIFICATION AND CONTEXTUALIZATION

Aspects of the present disclosure relate to techniques for providing a dynamic content classification and contextualization system using machine learning models. In particular, techniques described herein involve generating a classification of content and an associated confidence score using a machine learning model, retrieving contextual data if the confidence score does not exceed a threshold score, generating an updated classification based on the contextual data, and performing an action based on the updated classification.

BACKGROUND

Every year, millions of people, businesses, and organizations around the world use software applications to assist with countless aspects of life. The use of machine learning models, including language processing machine learning models, in software applications has become widespread. Because of this, both the amount of content and the variety of content processed by, for example, language processing machine learning models have greatly increased. Additionally, the content may often contain subject matter that is unsafe (e.g., for processing, displaying to a user, and/or the like). It is important, therefore, to promptly identify and remove any unsafe content from the remaining content prior to the processing, displaying, etc. Existing techniques may utilize machine learning models that are specially trained for detecting the unsafe content. Training machine learning models is often costly, with respect to both time and computing resources (e.g., as training may be based on a vast amount of unstructured data that takes time and resources to process). Furthermore, without constant updates, the data becomes nearly immediately outdated (e.g., as content, along with what is considered unsafe, is continuously evolving), which results in an inefficient and inaccurate system that leads to unidentified and/or misidentified content. That content may pose concerns for users, as well as computing systems, if not properly identified and removed.

Thus, there is a need in the art for improved techniques for automatically detecting unsafe content in software applications.

BRIEF SUMMARY

Certain embodiments provide a method for providing a dynamic content classification and contextualization system using machine learning models. The method generally includes: determining, using a machine learning model, a classification of content contained in an input provided to the machine learning model; generating, using the machine learning model, a confidence score for the classification; extracting one or more entities from the content based on determining that the confidence score is below a threshold score; retrieving, using a language processing machine learning model, contextual data from a searchable knowledge base based on the one or more entities extracted from the content; generating, using the machine learning model, an updated classification based on the retrieving; and performing an action based on the updated classification.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 depicts example operations related to providing a dynamic content classification and contextualization system using machine learning models.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
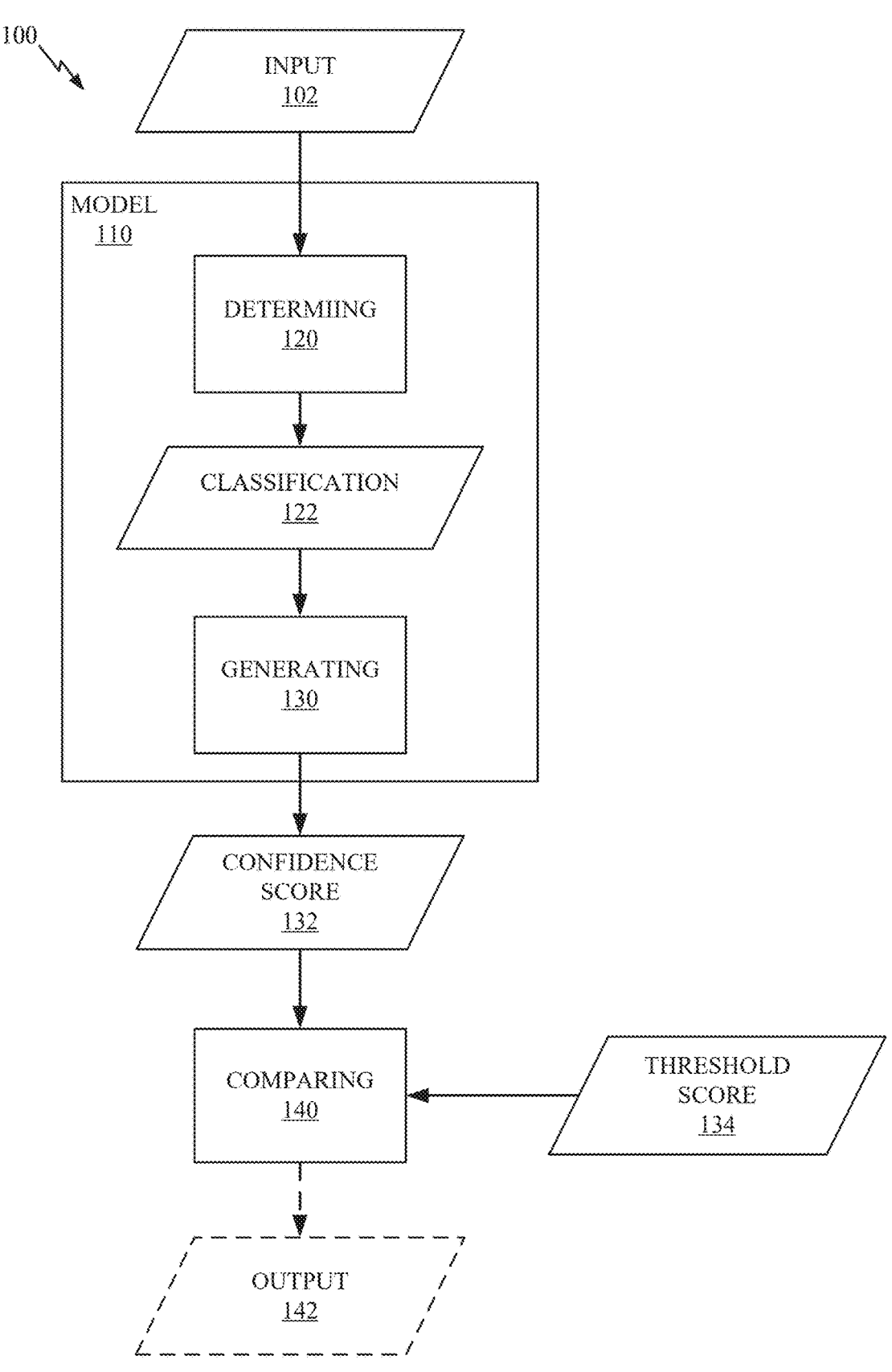
FIG. 1 depicts an example workflow related to providing a dynamic content classification and contextualization system using machine learning models.

Aspects of the present disclosure provide apparatuses, methods, processing systems, and computer-readable mediums for providing a dynamic content classification and contextualization system using machine learning models.

Increasing amounts of content are processed through software applications on a daily basis, some of which may be considered unsafe (e.g., due to inappropriate subject matter, computing security risks, and/or the like). Some current techniques for identifying and separating unsafe content from safe content employ machine learning models trained to detect the unsafe content. Those techniques, however, do not account for the vast and fluctuating types of unsafe content that are possible, which results in inaccurate classifications and/or overlooked content. Additionally, attempting to continuously train models on updated data would use significant time and computing resources. To improve machine learning model performance in content detection, techniques described herein employ a series of machine learning models to generate content classifications along with a confidence score for each classification and, if a confidence score is below a threshold, retrieve additional contextual data (such as from a searchable knowledge base) to update the corresponding classification. Such techniques result in a dynamic process that ensures the most accurate identification of unsafe content while conserving resources.

For example, a machine learning model, such as a language processing machine learning model, may generate a classification of content in an input provided to the machine learning model. The language processing machine learning model may, for instance, be a large language model capable of processing natural language inputs and generating natural language outputs. Additionally, the machine learning model may have been trained using a supervised learning process to identify content types and distinguish the content types with an associated level of confidence. The input may contain a variety of content in the form of text, numbers, images, or a combination thereof. The classification generated by the machine learning model may contain an indication of whether the input contained safe content, unsafe content, or both. Along with the classification, the machine learning model may also generate a confidence score. The confidence score may, for instance, include a percentage of likelihood that the content is unsafe (e.g., 85%). If the confidence score exceeds a threshold level of confidence (i.e., the system correctly classified the content to a particular degree of certainty), then the classification process is complete (e.g., unsafe content may be removed and the remaining, safe content may be sent for further processing, displayed to a user, etc.). If the confidence score does not exceed the threshold score, however, the input may undergo further analysis.

For example, key entities may be extracted from the input (such as dates, locations, names, and/or the like) such as by using a named entity recognition machine learning model. Based on the key entities, context data may be retrieved to provide additional insight as to whether some or all of the content contained in the input is unsafe. For example, the key entities may be entered as search terms into a searchable knowledge base (e.g., a search engine) to find information related to those entities. In some cases, embedding similarity may be used to determine what data is most relevant to the entities. The data may also be prioritized based on recency, such as a publication date, in order to ensure that the most up-to-date information is utilized. Based on the data retrieved from the search, the machine learning model may then generate an updated classification (i.e., of whether unsafe content is present in the input), along with a corresponding confidence score. If the confidence score is now above the threshold score, the process may conclude. An action may then be performed based on the updated classification, such as removing the unsafe content from the input. In some cases, information associated with the updated classification (such as the particular content that was deemed unsafe, the context data that was retrieved and used, etc.) may be stored in a data cache. That information may then be used to fine-tune the machine learning model (e.g., if a certain number of classifications are generated with low confidence scores) to ensure that the model remains trained on the latest data available.

Embodiments of the present disclosure provide numerous technical and practical effects and benefits. Current techniques for detecting unsafe content using machine learning models do not take into account the evolving nature of what may be considered unsafe content, which causes inaccurate and/or missed classifications. Additionally, continuously training or retraining models in order to keep up with those changes requires significant computing resources and time, resulting in high costs. The present disclosure solves this technical problem. Techniques described herein ensure more efficient, less costly processing while increasing model accuracy. By first generating a classification and a corresponding confidence score, the system may then automatically retrieve additional information to provide further insight and context when appropriate (e.g., while avoiding the computing resource utilization associated with such retrieval when not warranted), allowing for a more accurate and complete determination (e.g., of whether the content is unsafe) in a targeted and efficient manner. The additional information is also the most updated data available as it may be retrieved directly from its source, such as a search engine. This may reduce or eliminate the need to regularly train the machine learning models (e.g., since the most up-to-date information is automatically retrieved from its source), which saves substantial time and computing resources. Additionally, data retrieved and used by the system may be stored for future use (e.g., during the classifying) and training, further streamlining both processes and improving resource efficiency. Overall, techniques described herein provide a more accurate and efficient system for detecting unsafe content, as compared to prior techniques, by utilizing more complete and more updated information in a targeted on-demand fashion, while decreasing model training costs.

Example Workflows Related to Providing a Dynamic Content Classification and Contextualization System Using Machine Learning Models FIG. 1 depicts an example workflow 100 related to providing a dynamic content classification and contextualization system using machine learning models. For example, workflow 100 may represent a series of steps associated with generating a classification of content and an associated confidence score using a machine learning model.

An input 102 may be provided to a model 110. The input 102 may contain content to be classified as safe or unsafe. For example, the content may have been provided to a software application or may have been created by one or more components of a software application and is to be evaluated before processing or displaying to a user. The content may comprise natural language text, numbers, and/or images, among other content types and combinations. The model 110 may comprise a machine learning model. In one example, model 110 is a language processing machine learning model such as a large language model (LLM). For example, model 110 may have been trained on a large training data set in order to process natural language inputs and generate natural language content in response. In some embodiments, model 110 is a generative pre-trained transformer (GPT) model that has been trained on a large set of training data (e.g., across a plurality of domains), and is capable as a result of such training to perform a wide variety of language-related tasks in response to natural language prompts. In some embodiments, model 110 has been fine-tuned for one or more particular domains, such as for use with a particular software application or for a specific purpose, while in other embodiments model 110 has been trained in a more general fashion and has not been fine-tuned in such a manner. Model 110 may have a large number of tunable parameters, which are iteratively adjusted during a model training process based on training data. In alternative embodiments, model 110 may be another type of machine learning model that is capable of generating content. For example, model 110 may be a generative adversarial network (GAN), an autoencoder model, an autoregressive model, a diffusion model, a Bayesian network, a hidden Markov model, and/or the like. In general, machine learning models such as LLMs are trained (and/or fine-tuned) by exposing the model to large datasets and iteratively adjusting internal parameters, such as to minimize an objective function. The objective function quantifies the difference between the model's predictions and the desired outputs (e.g., which may be indicated by labels in the training data or otherwise may be the target output of the model), guiding the optimization process to improve model performance over time. In particular, the model 110 may have been trained using a supervised learning process to identify content types and distinguish the content types with an associated level of confidence, as discussed below.

During determining 120, the model 110 may determine a classification 122 for the content contained in the input 102. For example, the content may be classified as safe, unsafe, or a combination thereof (e.g., a portion of the content may be deemed unsafe while the rest is safe). Unsafe content, such as content that may pose a danger to personal privacy, computing security, and/or the like, may comprise content that is associated with inappropriate subject matter (e.g., profanity, explicit content, controversial topics, etc.), sensitive information (e.g., social security numbers, credit card numbers, etc.), and/or risky text or files (e.g., malware, viruses, etc.). Along with the classification, the model 110 may generate, during generating 130, a confidence score 132. The confidence score 132 may comprise an indication of the level of certainty with which the model 110 was able to classify the content. For example, a confidence score of 0.85, or 85%, may indicate that the model 110 is 85% sure that the particular content is unsafe (or safe). In some aspects, confidence scores may be numerical values between zero and one.

Then, during comparing 140, the confidence score 132 may be compared to a threshold score 134. If the confidence score 132 is equal to or greater than the threshold score 134, then the classification process is complete and remedial action may be performed based on the classification 122, such as removing any unsafe content from the input 102, determining not to perform further processing on the input 102, and/or the like. If the confidence score 132 does not meet or exceed the threshold score 134, then further steps may be taken to supplement the classification, as described in more detail below with respect to FIG. 2. Output 142 may include an indication of whether the confidence score exceeds the threshold score 134, what actions are to be performed, etc. In some embodiments, an output 142 may not be generated and the process proceeds directly to the next steps (e.g., removing content, updating the classification, etc.).

Figure 2:
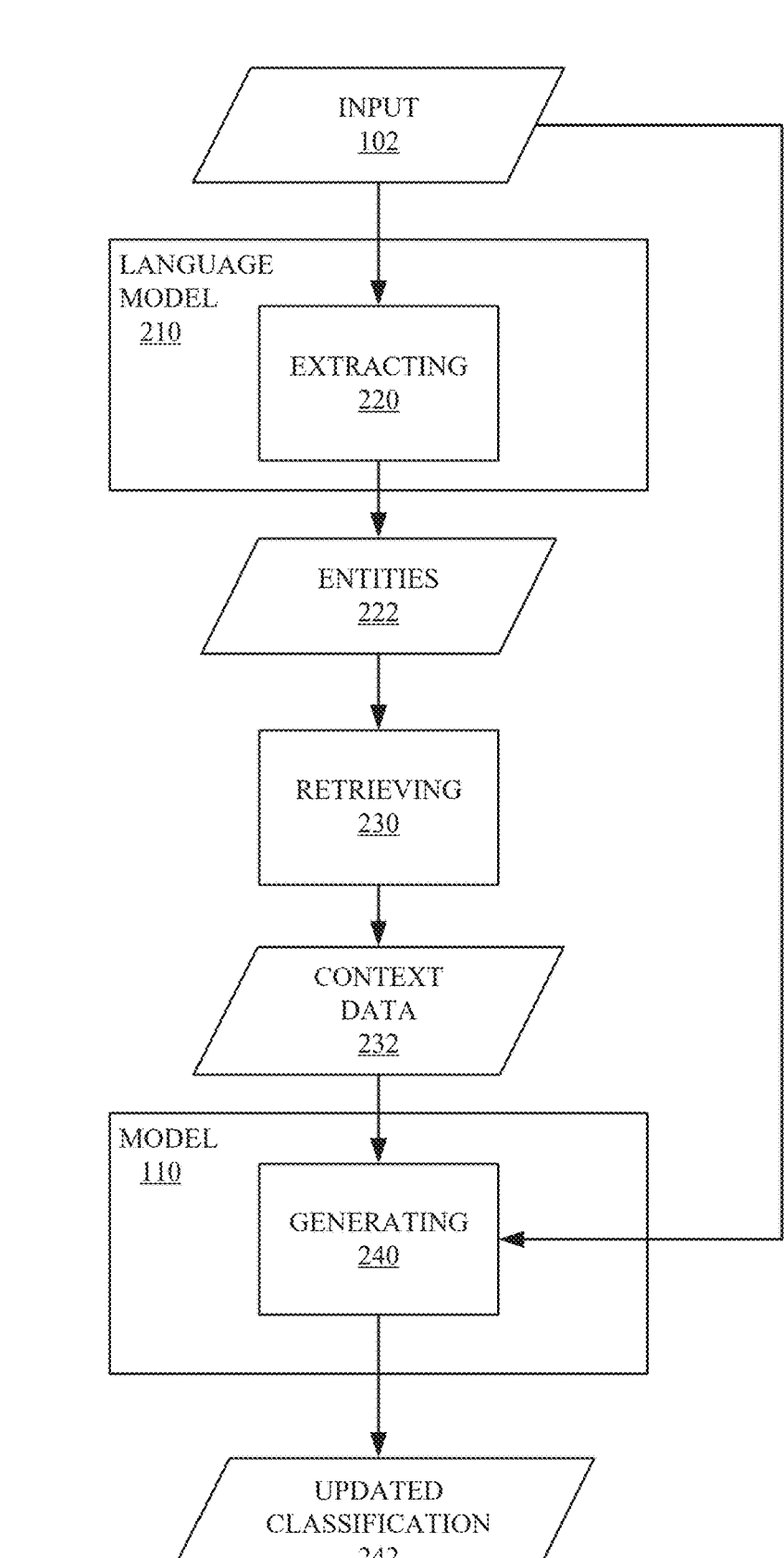
FIG. 2 depicts an additional example workflow related to providing a dynamic content classification and contextualization system using machine learning models.

FIG. 2 depicts an additional example workflow 200 related to providing a dynamic content classification and contextualization system using machine learning models. In particular, FIG. 2 depicts a series of steps by which context data is retrieved and used to generate an updated classification of content.

If the confidence score 132 (e.g., from FIG. 1) does not meet or exceed the threshold score 134, further information may be retrieved to provide context to assist the machine learning model (e.g., model 110) in generating an updated classification. For example, entities 222 may first be extracted, during extracting 220, from the input 102, such as by using a language model 210 (such as an LLM or other type of language processing machine learning model). In some embodiments, language model 210 may be a named entity recognition machine learning model. A named entity recognition model may be a machine learning model, such as a neural network or transformer-based architecture, trained on annotated training data through a supervised learning process to recognize and extract entities from input text. The extraction process performed by the model may involve parsing the input text, generating tokenized representations, and assigning entity labels based on detecting learned contextual and semantic features in the tokenized representations. Entities 222 may comprise key words and/or other characteristics from the input 102. For example, entities 222 may include names, locations, dates, uncommon phrases, and/or any other text that may provide insight as to whether the content is safe or unsafe.

Based on the entities 222, context data 232 may be retrieved, such as from a searchable knowledge base, during retrieving 230. For example, the entities 222 may be provided as search terms to a search engine connected to the internet. As a result, context data 232 will include the most updated and relevant information for determining a classification for the content. For example, the top ten most closely related (i.e., to the entities 222) documents may be retrieved from the search, where the relevance may be determined using embedding similarity. Embedding similarity generally refers to the process of generating embeddings, or vector representations, of natural language text (e.g., using an embedding model such as a neural network or other type of machine learning model) whose similarity may then be measured by calculating a distance between the embeddings in n-dimensional space (e.g., using cosine similarity, Euclidean distance, or the like). In some embodiments, the context data 232 may also be retrieved and/or organized according to recency. For example, documents with more recent publication dates may be prioritized as having the most up-to-date information available.

The context data 232 may be provided back to the model 110 and, based on the context data 232 and the input 102, the model 110 may generate an updated classification 242 of the content during generating 240 (e.g., according to one or more steps described above with respect to FIG. 1). In some embodiments, the model 110 may generate a confidence score for the updated classification 242 which may then be compared to the threshold score 134. If the new confidence score is equal to or greater than the threshold score 134, then the classification process is complete and one or more remedial actions may be performed based on the updated classification 242, such as removing any unsafe content from the input 102, determining not to perform further processing on the input 102, deleting the input 102, generating a notification or alert indicating that the input 102 may contain unsafe content, logging or displaying (via a user interface) such a notification or alert, and/or the like. In some embodiments, information associated with the updated classification 242 may be stored and/or used to train or fine-tune the model 110, as described in more detail below with respect to FIG. 3. If the new confidence score does not meet or exceed the threshold score 134, then the process of retrieving additional context data and updating the classification may be repeated until the associated confidence score meets or exceeds the threshold score 134.

Figure 3:
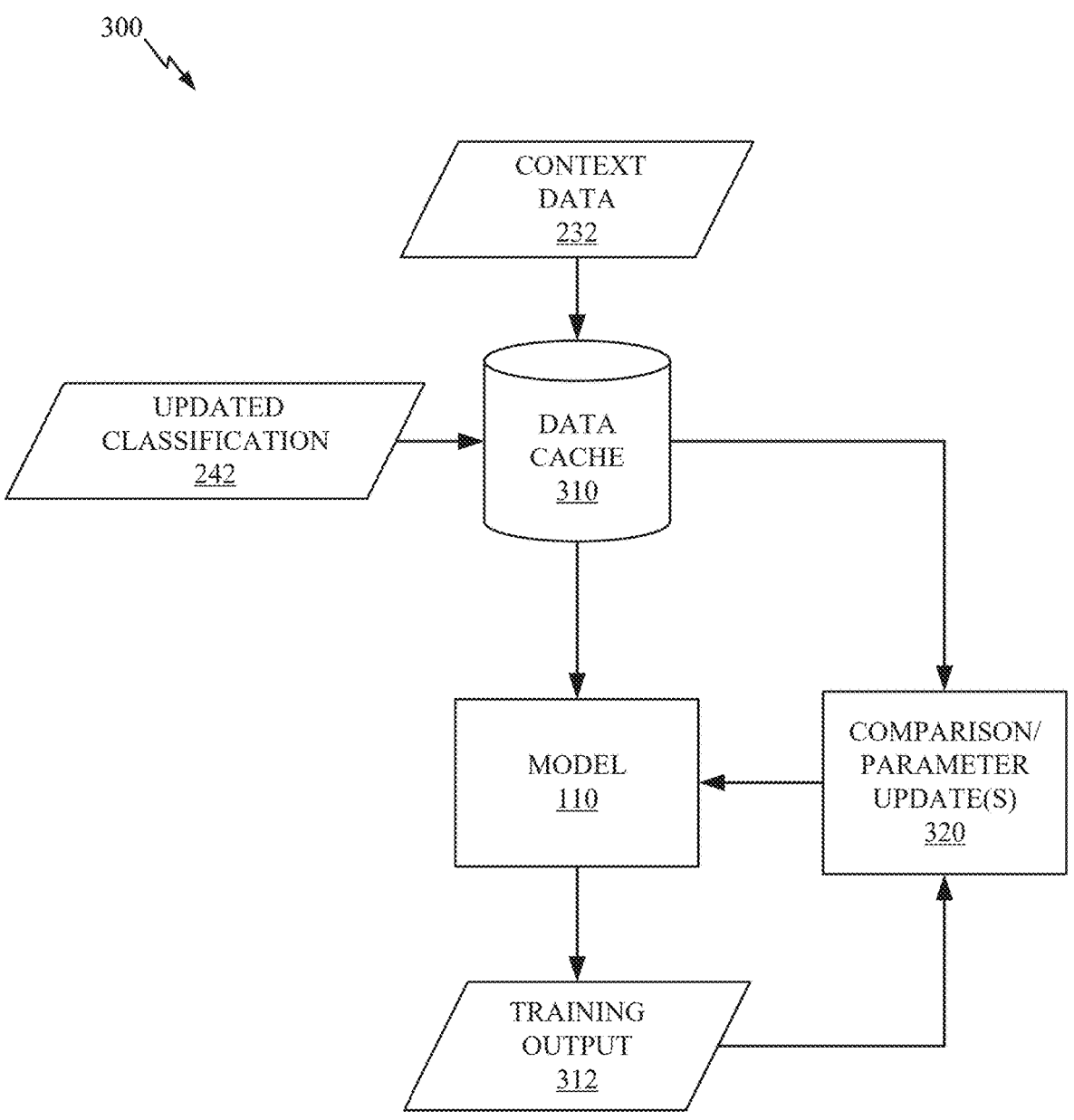
FIG. 3 depicts an additional example workflow related to providing a dynamic content classification and contextualization system using machine learning models.

FIG. 3 depicts an additional example workflow 300 related to providing a dynamic content classification and contextualization system using machine learning models. In particular, FIG. 3 depicts a series of steps associated with storing information related to updated classifications generated by a machine learning model and subsequently fine-tuning the machine learning model using that information.

In some embodiments, such as when an updated classification 242 is generated with a high confidence score (e.g., 0.95), information associated with the updated classification 242 may be stored in a data cache 310. In one example, the data cache 310 may be a short-term memory queue. The information may comprise the updated classification 242, along with the context data 232 used to generate the updated classification 242. In some embodiments, other associated data may also be stored in the data cache 310, such as the entities 222 used to retrieve the context data 232 and/or reasons for why the model 110 classified content in the input 102 a certain way (e.g., as unsafe).

The model 110 may then be fine-tuned using the information in the data cache 310. In some embodiments, the fine-tuning may be performed after a threshold number of classifications (e.g., classification 122 of FIG. 1) have a corresponding confidence score (e.g., confidence score 132 of FIG. 1) below a threshold score (e.g., threshold score 134 of FIG. 1). For example, cases that proceed to context data retrieval and classification updates may be monitored using statistical process control (SPC) charts, which contain a lower control limit (which may be zero in many instances) and an upper control limit. If the rate of cases that proceed to the data retrieval exceeds the upper control limit (e.g., 2%), the system may be automatically signaled to fine-tune the model 110 (e.g., using the information stored in the data cache 310). This ensures that the model 110 remains updated on recent developments in what may be considered unsafe content, but without wasting significant time and resources by having to constantly retrain the model (i.e., since it may utilize the context data retrieval feature in between fine-tuning).

The fine-tuning may involve a supervised learning process by which training inputs from the data cache 310 are provided to the model 110, the training output 312 generated by the model 110 is compared (e.g., based on evaluating an objective function) to labels associated with the training inputs in the data cache 310, and parameters of the model 110 are iteratively adjusted based on the comparing, such as during comparison/model parameter updates 320, until one or more conditions are met (e.g., until the training output 312 matches the labels, until one or more objectives of an objective function meet one or more conditions, and/or the like). In other embodiments, the training may comprise using direct preference optimization to fine-tune the model 110, such as based on user feedback. Direct preference optimization refers to a supervised learning process in which a machine learning model is fine-tuned based on preference signals or feedback, such as user-selected outputs or rankings, rather than traditional label-based objectives. In such an approach, preference data, often collected from end users or domain experts, serves as ground truth for updating the model parameters. The optimization procedure typically involves structuring the training data as pairs or sets of outputs, where at least one output is preferred over others for a given input. The model is then trained to increase the likelihood of generating or selecting the preferred output, such as via a loss function designed to maximize agreement with observed preferences. Direct preference optimization can improve model performance on nuanced or subjective tasks, enabling adaptive refinement in response to evolving standards or user expectations, and may be particularly effective in scenarios where explicit labels are difficult to define but qualitative judgments are available.

Example Operations Related to Providing a Dynamic Content Classification and Contextualization System Using Machine Learning Models FIG. 4 depicts example operations 400 related to providing a dynamic content classification and contextualization system using machine learning models. For example, operations 400 may be performed by one or more of the components described with respect to FIG. 1, FIG. 2, and/or FIG. 3.

Operations 400 begin at step 402 with determining, using a machine learning model, a classification of content contained in an input provided to the machine learning model. In some embodiments, the machine learning model is trained using a supervised learning process to identify content types and distinguish the content types with an associated level of confidence.

Operations 400 continue at step 404 with generating, using the machine learning model, a confidence score for the classification.

Operations 400 continue at step 406 with extracting one or more entities from the content based on determining that the confidence score is below a threshold score.

Operations 400 continue at step 408 with retrieving, using a language processing machine learning model, contextual data from a searchable knowledge base based on the one or more entities extracted from the content. According to certain embodiments, the retrieving, using the language processing machine learning model, the contextual data from the searchable knowledge base comprises generating one or more natural language search terms via the language processing machine learning model based on the one or more entities extracted from the content and performing a search via a search engine using the one or more natural language search terms. Some embodiments provide that the retrieving, using the language processing machine learning model, the contextual data from the searchable knowledge base is based on embedding similarity and further based on a time measure associated with available data in the searchable knowledge base.

Operations 400 continue at step 410 with generating, using the machine learning model, an updated classification based on the retrieving. In certain embodiments, the generating, using the machine learning model, the updated classification based on the retrieving comprises providing the contextual data to the machine learning model and evaluating, by the machine learning model, the content based on the contextual data.

Operations 400 continue at step 412 with performing an action based on the updated classification. According to some embodiments, the performing the action based on the updated classification comprises one or more of: removing the content from the input; or storing information associated with the updated classification in a data cache. Certain embodiments provide that the method further comprises fine-tuning the machine learning model using the information associated with the updated classification if a number of classifications with a confidence score below the threshold score exceeds a threshold control value.

Figure 5:
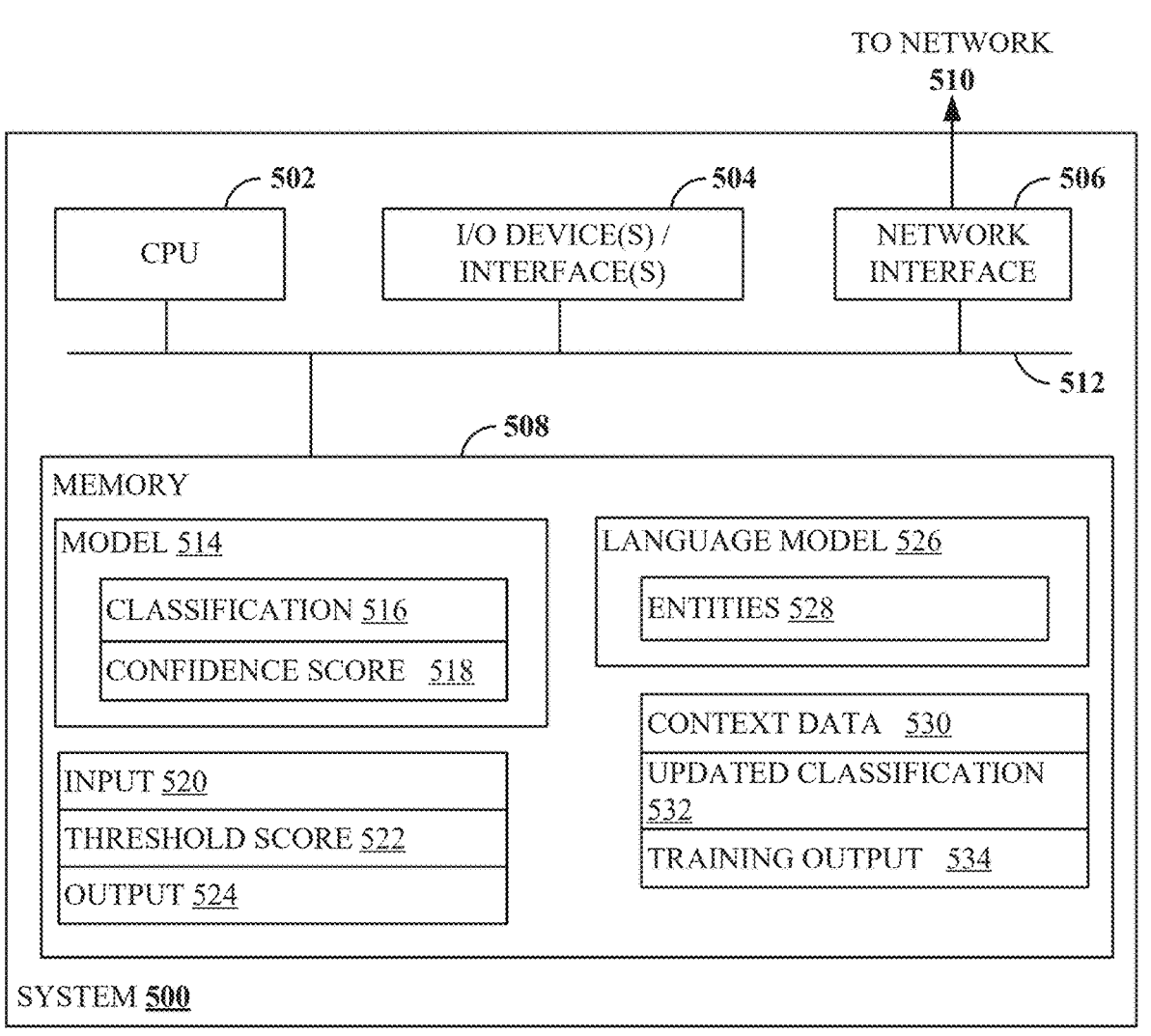
FIG. 5 depicts an example of a processing system for providing a dynamic content classification and contextualization system using machine learning models.

Example of a Processing System for Providing a Dynamic Content Classification and Contextualization System Using Machine Learning Models FIG. 5 illustrates an example system 500 with which embodiments of the present disclosure may be implemented. For example, system 500 may be configured to perform operations 400 of FIG. 4 and/or to implement one or more components as in FIG. 1, FIG. 2, or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes model 514, classification 516, confidence score 518, input 520, threshold score 522, and output 524. Model 514 may be representative of model 110 of FIG. 1, FIG. 2, and FIG. 3. Classification 516 may be representative of classification 122 of FIG. 1. Confidence score 518 may be representative of confidence score 132 of FIG. 1. Input 520 may be representative of input 102 of FIG. 1 and FIG. 2. Threshold score 522 may be representative of threshold score 134 of FIG. 1. Output 524 may be representative of output 142 of FIG. 1.

Memory 508 further comprises language model 526 which may correspond to language model 210 of FIG. 2. Memory 508 further comprises entities 528, which may correspond to entities 222 of FIG. 2. Memory 508 further comprises context data 530, which may correspond to context data 232 of FIG. 2 and FIG. 3. Memory 508 further comprises updated classification 532, which may correspond to updated classification 242 of FIG. 2 and FIG. 3. Memory 508 further comprises training output 534, which may correspond to training output 312 of FIG. 3. It is noted that in some embodiments, system 500 may interact with one or more external components, such as via network 510, in order to retrieve data and/or perform operations. Furthermore, techniques described herein may be implemented via more or fewer components than those shown and described with respect to FIG. 5, such as on one or more computing systems.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware compo-
nents, or any combination thereof designed to perform the
functions described herein. A general-purpose processor
may be a microprocessor, but in the alternative, the proces-
sor may be any commercially available processor, controller,
microcontroller, or state machine. A processor may also be
implemented as a combination of computing devices, e.g., a
combination of a DSP and a microprocessor, a plurality of
microprocessors, one or more microprocessors in conjunc-
tion with a DSP core, or any other such configuration.

A processing system may be implemented with a bus
architecture. The bus may include any number of intercon-
necting buses and bridges depending on the specific appli-
cation of the processing system and the overall design
constraints. The bus may link together various circuits
including a processor, machine-readable media, and input/
output devices, among others. A user interface (e.g., keypad,
display, mouse, joystick, etc.) may also be connected to the
bus. The bus may also link various other circuits such as
timing sources, peripherals, voltage regulators, power man-
agement circuits, and other types of circuits, which are well
known in the art, and therefore, will not be described any
further. The processor may be implemented with one or
more general-purpose and/or special-purpose processors.
Examples include microprocessors, microcontrollers, DSP
processors, and other circuitry that can execute software.
Those skilled in the art will recognize how best to implement
the described functionality for the processing system
depending on the particular application and the overall
design constraints imposed on the overall system.

If implemented in software, the functions may be stored
or transmitted over as one or more instructions or code on a
computer-readable medium. Software shall be construed
broadly to mean instructions, data, or any combination
thereof, whether referred to as software, firmware, middle-
ware, microcode, hardware description language, or other-
wise. Computer-readable media include both computer stor-
age media and communication media, such as any medium
that facilitates transfer of a computer program from one
place to another. The processor may be responsible for
managing the bus and general processing, including the
execution of software modules stored on the computer-
readable storage media. A computer-readable storage
medium may be coupled to a processor such that the
processor can read information from, and write information
to, the storage medium. In the alternative, the storage
medium may be integral to the processor. By way of
example, the computer-readable media may include a trans-
mission line, a carrier wave modulated by data, and/or a
computer readable storage medium with instructions stored
thereon separate from the wireless node, all of which may be
accessed by the processor through the bus interface. Alter-
natively, or in addition, the computer-readable media, or any
portion thereof, may be integrated into the processor, such as
the case may be with cache and/or general register files.
Examples of machine-readable storage media may include,
by way of example, RAM (Random Access Memory), flash
memory, ROM (Read Only Memory), PROM (Program-
mable Read-Only Memory), EPROM (Erasable Program-
mable Read-Only Memory), EEPROM (Electrically Eras-
able Programmable Read-Only Memory), registers,
magnetic disks, optical disks, hard drives, or any other
suitable storage medium, or any combination thereof. The
machine-readable media may be embodied in a computer-
program product.

A software module may comprise a single instruction, or
many instructions, and may be distributed over several different code segments, among different programs, and
across multiple storage media. The computer-readable
media may comprise a number of software modules. The
software modules include instructions that, when executed
by an apparatus such as a processor, cause the processing
system to perform various functions. The software modules
may include a transmission module and a receiving module.
Each software module may reside in a single storage device
or be distributed across multiple storage devices. By way of
example, a software module may be loaded into RAM from
a hard drive when a triggering event occurs. During execu-
tion of the software module, the processor may load some of
the instructions into cache to increase access speed. One or
more cache lines may then be loaded into a general register
file for execution by the processor. When referring to the
functionality of a software module, it will be understood that
such functionality is implemented by the processor when
executing instructions from that software module.

The following claims are not intended to be limited to the
embodiments shown herein, but are to be accorded the full
scope consistent with the language of the claims. Within a
claim, reference to an element in the singular is not intended
to mean "one and only one" unless specifically so stated, but
rather "one or more." Unless specifically stated otherwise,
the term "some" refers to one or more. No claim element is
to be construed under the provisions of 35 U.S.C. § 112 (f)
unless the element is expressly recited using the phrase
"means for" or, in the case of a method claim, the element
is recited using the phrase "step for." All structural and
functional equivalents to the elements of the various aspects
described throughout this disclosure that are known or later
come to be known to those of ordinary skill in the art are
expressly incorporated herein by reference and are intended
to be encompassed by the claims. Moreover, nothing dis-
closed herein is intended to be dedicated to the public
regardless of whether such disclosure is explicitly recited in
the claims.

What is claimed is:

1. A method for providing a dynamic content classifica-
tion and contextualization system using machine learning
models, comprising:

determining, using a machine learning model, a classifi-
cation of content contained in an input provided to the
machine learning model, wherein the machine learning
model is trained to identify content types and distin-
guish the content types with an associated level of
confidence using a supervised learning process by
iteratively adjusting tunable parameters of the machine
learning model based on training data associated with
stored content classifications;

generating, using the machine learning model, a confi-
dence score for the classification;

extracting one or more entities from the content based on
determining that the confidence score is below a thresh-
old score, wherein the extracting comprises parsing the
input, generating tokenized representations, and assign-
ing entity labels based on detecting learned features in
the tokenized representations;

retrieving, using a language processing machine learning
model, contextual data from a searchable knowledge
base based on the one or more entities extracted from
the content;

generating, using the machine learning model, an updated
classification based on the retrieving; and performing an action based on the updated classification.

2. The method of claim 1, wherein the retrieving, using
the language processing machine learning model, the contextual data from the searchable knowledge base comprises generating one or more natural language search terms via the language processing machine learning model based on the one or more entities extracted from the content and performing a search via a search engine using the one or more natural language search terms.

3. The method of claim 1, wherein the retrieving, using the language processing machine learning model, the contextual data from the searchable knowledge base is based on embedding similarity and further based on a time measure associated with available data in the searchable knowledge base.

4. The method of claim 1, wherein the generating, using the machine learning model, the updated classification based on the retrieving comprises providing the contextual data to the machine learning model and evaluating, by the machine learning model, the content based on the contextual data.

5. The method of claim 1, wherein the performing the action based on the updated classification comprises one or more of:

removing the content from the input; or storing information associated with the updated classification in a data cache.

6. The method of claim 5, further comprising fine-tuning the machine learning model using the information associated with the updated classification if a number of classifications with a confidence score below the threshold score exceeds a threshold control value.

7. A system for providing a dynamic content classification and contextualization system using machine learning models, comprising:

one or more processors; and a memory comprising instructions that, when executed by the one or more processors, cause the system to:

determine, using a machine learning model, a classification of content contained in an input provided to the machine learning model, wherein the machine learning model is trained to identify content types and distinguish the content types with an associated level of confidence using a supervised learning process by iteratively adjusting tunable parameters of the machine learning model based on training data associated with stored content classifications;

generate, using the machine learning model, a confidence score for the classification;

extract one or more entities from the content based on determining that the confidence score is below a threshold score, wherein the extracting comprises parsing the input, generating tokenized representations, and assigning entity labels based on detecting learned features in the tokenized representations;

retrieve, using a language processing machine learning model, contextual data from a searchable knowledge base based on the one or more entities extracted from the content;

generate, using the machine learning model, an updated classification based on the retrieving; and perform an action based on the updated classification.

8. The system of claim 7, wherein the retrieving, using the language processing machine learning model, the contextual data from the searchable knowledge base comprises generating one or more natural language search terms via the language processing machine learning model based on the one or more entities extracted from the content and performing a search via a search engine using the one or more natural language search terms.

9. The system of claim 7, wherein the retrieving, using the language processing machine learning model, the contextual data from the searchable knowledge base is based on embedding similarity and further based on a time measure associated with available data in the searchable knowledge base.

10. The system of claim 7, wherein the generating, using the machine learning model, the updated classification based on the retrieving comprises providing the contextual data to the machine learning model and evaluating, by the machine learning model, the content based on the contextual data.

11. The system of claim 7, wherein the performing the action based on the updated classification comprises one or more of:

removing the content from the input; or storing information associated with the updated classification in a data cache.

12. The system of claim 11, wherein the instructions, when executed by the one or more processors, further cause the system to fine-tune the machine learning model using the information associated with the updated classification if a number of classifications with a confidence score below the threshold score exceeds a threshold control value.

13. A non-transitory computer readable medium comprising instructions that, when executed by one or more processors of a computing system, cause the computing system to:

determine, using a machine learning model, a classification of content contained in an input provided to the machine learning model, wherein the machine learning model is trained to identify content types and distinguish the content types with an associated level of confidence using a supervised learning process by iteratively adjusting tunable parameters of the machine learning model based on training data associated with stored content classifications;

generate, using the machine learning model, a confidence score for the classification;

extract one or more entities from the content based on determining that the confidence score is below a threshold score, wherein the extracting comprises parsing the input, generating tokenized representations, and assigning entity labels based on detecting learned features in the tokenized representations;

retrieve, using a language processing machine learning model, contextual data from a searchable knowledge base based on the one or more entities extracted from the content;

generate, using the machine learning model, an updated classification based on the retrieving; and perform an action based on the updated classification.

14. The non-transitory computer readable medium of claim 13, wherein the retrieving, using the language processing machine learning model, the contextual data from the searchable knowledge base comprises generating one or more natural language search terms via the language processing machine learning model based on the one or more entities extracted from the content and performing a search via a search engine using the one or more natural language search terms.

15. The non-transitory computer readable medium of claim 13, wherein the retrieving, using the language processing machine learning model, the contextual data from the searchable knowledge base is based on embedding similarity and further based on a time measure associated with available data in the searchable knowledge base.

16. The non-transitory computer readable medium of claim 13, wherein the generating, using the machine learning model, the updated classification based on the retrieving comprises providing the contextual data to the machine learning model and evaluating, by the machine learning model, the content based on the contextual data.

17. The non-transitory computer readable medium of claim 13, wherein the performing the action based on the updated classification comprises one or more of:

removing the content from the input; or storing information associated with the updated classification in a data cache.

* * * * *